United States Patent [19]

Patel et al.

[11] Patent Number: 5,282,216
[45] Date of Patent: Jan. 25, 1994

[54] HIGH DATA RATE DECODING METHOD FOR CODING SIGNAL PROCESSING CHANNELS

[75] Inventors: Arvind M. Patel; Robert A. Rutledge; Bum S. So, all of San Jose, Calif.

[73] Assignee: International Business Machines Corporation, Armonk, N.Y.

[21] Appl. No.: 920,027

[22] Filed: Jul. 27, 1992

Related U.S. Application Data

[63] Continuation of Ser. No. 470,020, Jan. 25, 1990, abandoned.

[51] Int. Cl.$^5$ .......................................... H03M 13/00
[52] U.S. Cl. ................................................. 371/43
[58] Field of Search ............... 371/43, 44, 45; 375/94, 375/102; 341/58, 59

[56] References Cited

U.S. PATENT DOCUMENTS

| | | | |
|---|---|---|---|
| 3,891,959 | 6/1975 | Tsuji et al. | 371/43 |
| 4,370,748 | 1/1983 | Janc et al. | 375/94 |
| 4,463,344 | 7/1984 | Adler et al. | 341/59 |
| 4,547,890 | 10/1985 | Gindi | 341/59 |
| 4,684,921 | 8/1987 | Fok et al. | 341/59 |
| 4,945,538 | 7/1990 | Patel | 371/43 |
| 5,010,558 | 4/1991 | Yost et al. | 371/43 |

FOREIGN PATENT DOCUMENTS

0173390  9/1985  Japan ........................... 371/43

Primary Examiner—Robert W. Beausoliel, Jr.
Assistant Examiner—Glenn Snyder
Attorney, Agent, or Firm—Henry E. Otto, Jr.

[57] ABSTRACT

A method for processing, in a signal processing channel, digital values corresponding to a digitized incoming analog signal representative of coded binary data. A state-dependent sequence detection algorithm includes two groups of appropriate functional expressions of digital sample values, which expressions are identical but offset one sample position from each other. During each iterating step with successive pairs of clock cycles, the value of each expression in the two groups of expressions is precomputed from a preselected number of sample values ahead of a then current sample value; preselected ones of these expression values are compared against an appropriate threshold, which is the same for corresponding expressions of each group, to provide respective binary decision outputs corresponding to each of the two groups; and the current state value then advances to two next successive state values. A pipelined configuration is utilized in which a different number of sample values, greater than said preselected number, is used ahead of the current sample value to allow sufficient time for precomputing said groups of expressions.

14 Claims, 6 Drawing Sheets

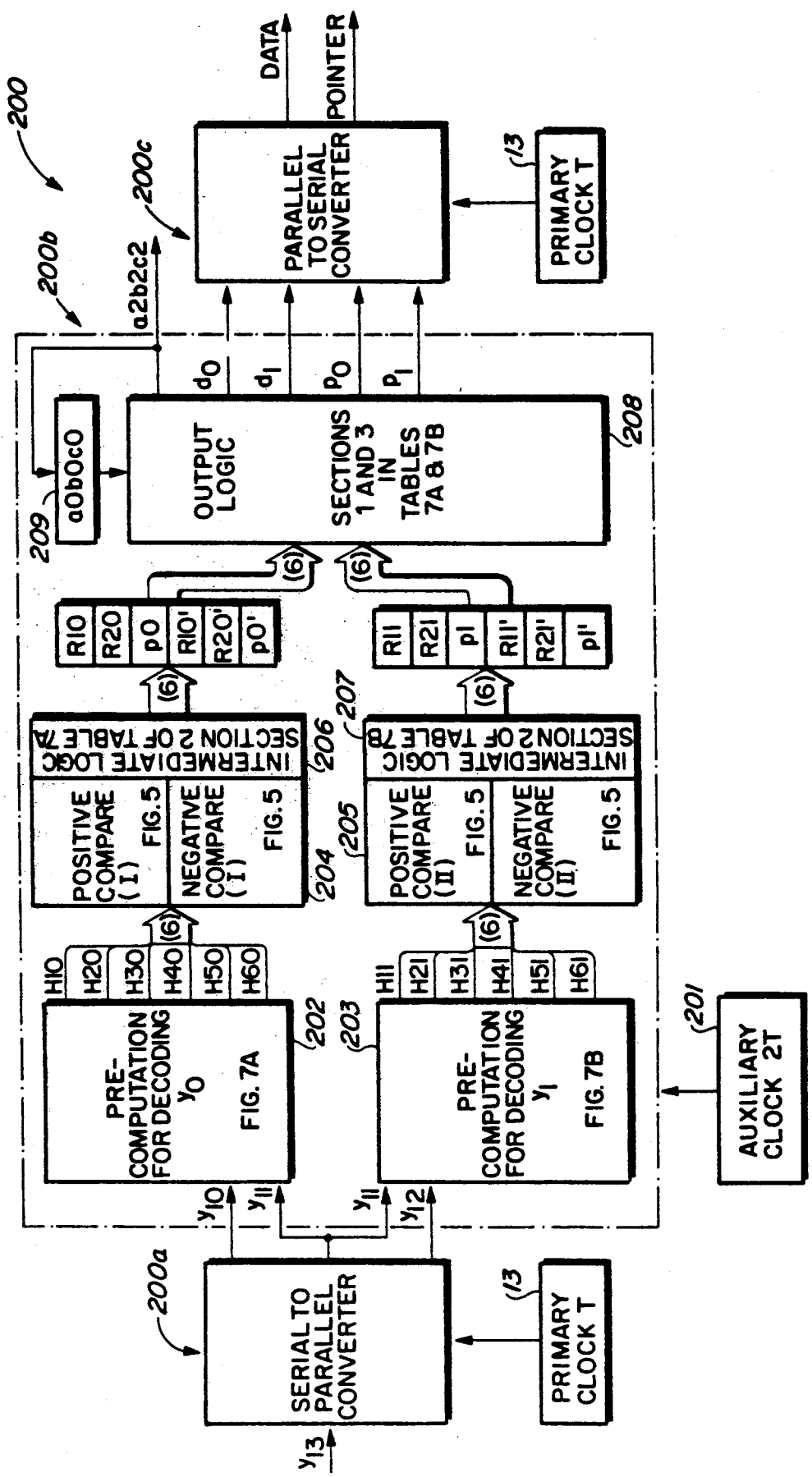

HIGH DATA RATE DECODING METHOD FOR CODING SIGNAL PROCESSING CHANNELS

This is a continuation of copending application Ser. No. 07/470,020, filed on Jan. 25, 1990, now abandoned.

This invention relates to a method and means for processing, in a coded signal processing channel, sample values representative of coded binary data, and more particularly relates to such a method for processing a signal for sequence detection at an integral multiple of the data rate for a preselected clock rate determined by a given VLSI technology.

BACKGROUND OF THE INVENTION

The present invention describes an improvement to and extension of the channel signal processing method described in copending application U.S. Ser. No. 07/270,895, filed Nov. 14, 1988 now U.S. Pat. No. 4,945,538.

While the method described in this cited earlier filed application operates satisfactorily, the data rate of the (1,7) coded partial response channel employed therein is limited by the speed of the electronic circuits in a given VLSI technology; more particularly in the time it takes to perform an 8-bit add operation and store it in a register. Also, it describes a five-sample look-ahead algorithm for processing channel sample values which works well when all error modes are caused by similar noise circumstances. However, in specific applications, such as magnetic and optical recording, when the readback pulse is distorted towards being too wide, the available distance is reduced for one particular pair of sequences of sample values. The reliability performance of the decoder, in that case, is predominantly determined by the lower margin of error associated with these sequences.

There is a need for an improved method and means for processing sample values in a coded signal processing channel that employs a look-ahead algorithm that is restructured to increase the data rate by allowing n cycles per operation and decoding n bits at a time.

There is also a need, in such a method, for an algorithm which, by providing additional information from a six- (rather than five) sample look-ahead, achieves higher reliability in signal detection and increased tolerance to distortion of the readback pulse.

SUMMARY OF THE INVENTION

Toward this end and according to the invention, a method and means is disclosed for processing, in a signal processing channel, digital values corresponding to a digitized incoming analog signal representative of coded binary data.

A state-dependent sequence detection algorithm includes two groups of appropriate functional expressions of digital sample values, which expressions are identical but offset one sample position from each other. During each iterating step with successive pairs of clock cycles, the value of each expression in the said two groups of expressions is precomputed from a preselected number of sample values ahead of a then current sample value; preselected ones of these expression values are compared against an appropriate threshold, which is the same for corresponding expressions of each group, to provide respective binary decision outputs corresponding to each of the two groups; and the current state value then advances to two next successive state values.

A pipelined configuration is preferably utilized in which a different number of sample values, greater than said preselected number, is used ahead of the current sample value to allow sufficient time for precomputing said groups of expressions.

BRIEF DESCRIPTION OF THE DRAWINGS

FIG. 6 is a block diagram showing the decoder for double data rate operation in a (1,7) maximum-likelihood (ML) channel, which includes a serial-to-parallel conversion of analog-to-digital (ADC) sample values, precomputation of two groups of functions for decoding $y_0$ and $y_1$, two groups of positive and negative compare circuits, intermediate logic, and output logic for generating decoded pairs of data bits and error pointers through a parallel-to-serial converter.

Note that FIGS. 1, 2A, 2B and 3 are identical with FIGURES of the same designation in the above-cited copending application, and are provided as background to facilitate understanding of the invention; FIGS. 4 and 5 constitute modifications of the corresponding FIGURES of identical designation in said cited application to include the new functions for a six-sample look-ahead algorithm; and FIGS. 6, 7A and 7B illustrate the new method steps embodying the invention.

BACKGROUND DESCRIPTION—prior art

The following description from the above-cited application is included in this section by way of background for more clearly explaining how the present invention is implemented.

Figure 1:
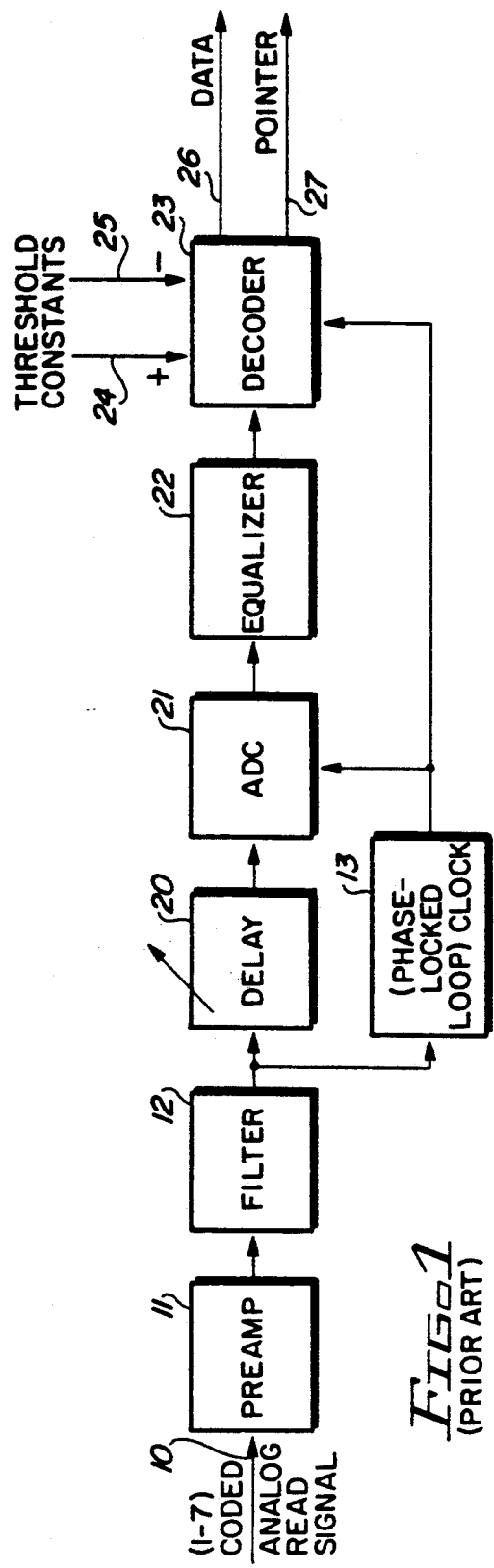
FIG. 1 is a schematic diagram of a coded digital signal processing channel.

As illustrated in FIG. 1, a signal processing channel includes a line 10 via which an analog read signal is fed from a transducer, such as a magnetic or optical read head in a digital storage device. This read signal corresponds to a recorded (1,7) data sequence, which is a binary data sequence coded with the (1,7) RLL code during the write operation. The read signal passes through a preamplifier 11 with automatic gain control (AGC) and a low bandpass filter 12. The output of filter 12 is supplied to a phase-locked clock 13 comprising a phase-locked loop timing recovery circuit including a variable frequency oscillator (VFO). This apparatus may be identical with that used in the conventional peak-detection channel with (1,7) code.

The channel is preferably of the type referred to as extended partial response maximum likelihood (EPRML) channel which is characterized by the polynomial $(1-D)(1+D)^2$. In EPRML signaling, the signal spectrum resembles a typical magnetic recording channel transfer function, desirably obviating the need for the notch filter required in the normal PRML channel characterized by the polynomial $(1-D)(1+D)$.

Figure 2A:
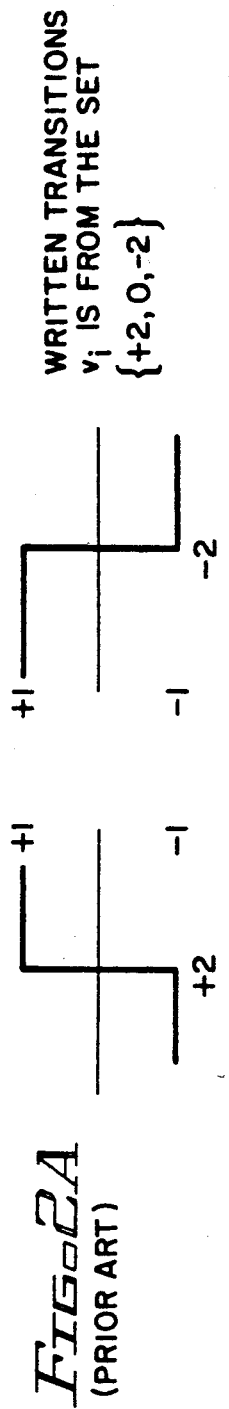
FIG. 2A depicts written transitions of magnitude 2 between +1 and −1 levels of magnetic saturation.
Figure 2B:
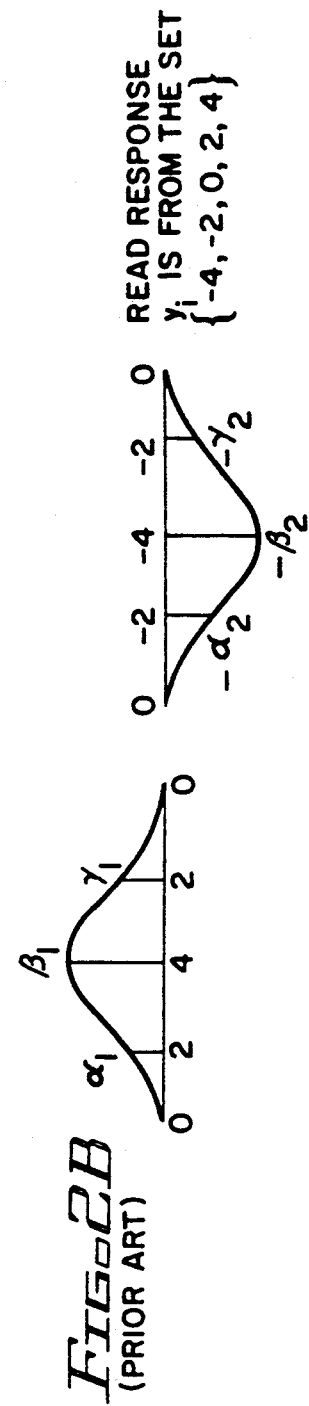
FIG. 2B depicts a read response normalized by a scaling factor to correspond to said written transitions.

More specifically, the filter 12 and equalizer 22 operate to filter the read signal so that the response to a single magnetic transition is a pulse given by the sample values ..., 0, 2, 4, 2, 0, .... FIG. 2A depicts written transitions of magnitude 2 between $+1$ and $-1$ levels of magnetic saturation; and FIG. 2B depicts the read response that is normalized by a scaling factor to correspond thereto.

In the environment herein described, use of the (1,7) RLL code reduces crowding of write transitions on the media to $\frac{2}{3}$ that experienced with the PRML or EPRML channel. The (1,7) code acts as a trellis code providing a built-in redundancy with its $\frac{2}{3}$ rate. It is very tolerant to nonlinearities in a high-density, high-data-rate magnetic recording channel.

Briefly, the coded analog read signal output from filter 12 is supplied to a delay means 20. Delay means 20 may be a digital chip of the type which permits selectively adjustable delays in increments as low as a tenth of a nanosecond, depending upon the rate of the clock. Delay means 20 provides delay alignment between the analog signal and clock signal inputs to an analog-to-digital converter (ADC) 21. ADC 21 converts the analog input signal into digital sample values at successive clock times. These digital sample values, in some cases depending on the characteristic of filter 12, may be equalized by an equalizer 22. The digital sample values are then passed to a decoder 23. Positive and negative threshold constants are applied via lines 24,25, respectively, to decoder 23. Decoder 23 applies a decoding algorithm to the equalized digitized sample values to provide a coded binary data output in line 26 and, where appropriate, a pointer flag in line 27, at successive clock times under control of clock 13.

Figure 3:
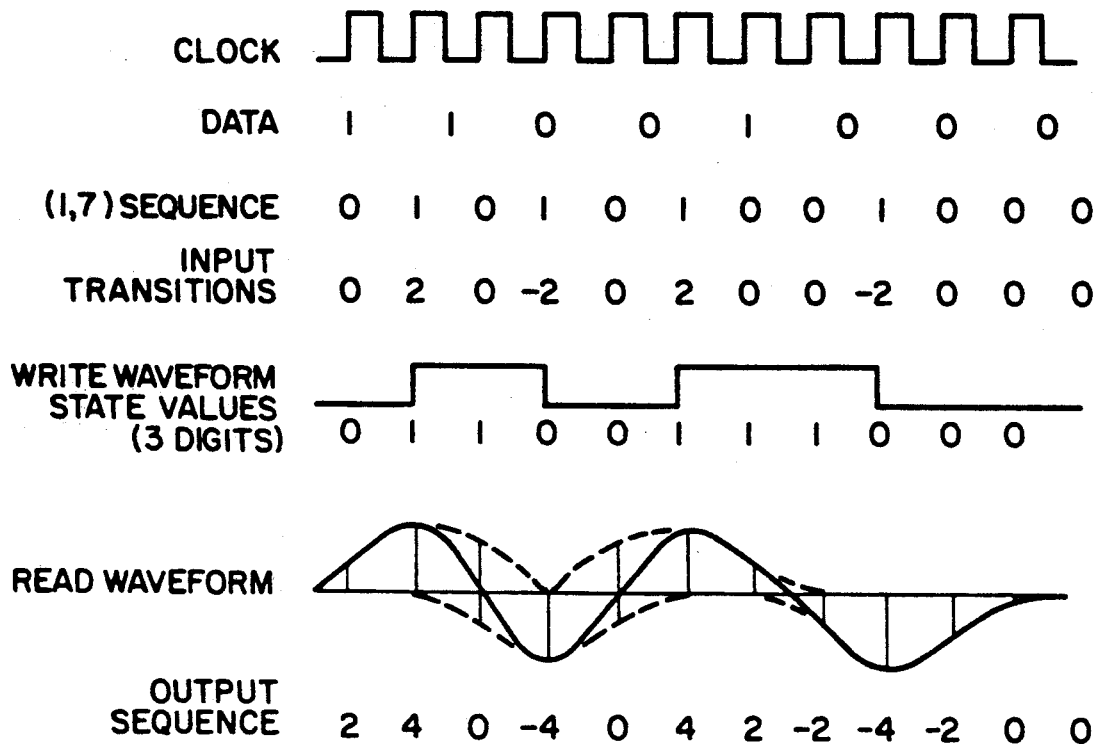
FIG. 3 shows write and read waveforms for (1,7) coded data and read sample values.

FIG. 3 depicts the write and read waveforms and associated sequences of data and sample values in a noise-free environment as they are clocked by clock 13. With the pulse shape as shown in FIGS. 2A,2B, the sample values, in accord with the decoder implementation, will range through the discrete set $\{-4, -2, 0, +2, +4\}$. Actual samples, however, will include signal anomalies and additive noise, and thus will range through various noninteger values around the integers in the discrete set.

The read clock is derived from read signal 10 using a conventional peak-detection circuit driving a variable frequency oscillator (VFO) in the clock 13. As earlier noted, the ADC 21 under control of clock 13 converts the analog signal to digitized sample values at successive clock times; and the digitized sample values are equalized at 22.

DESCRIPTION OF PREFERRED EMBODIMENT

Preliminary

Figure 4:
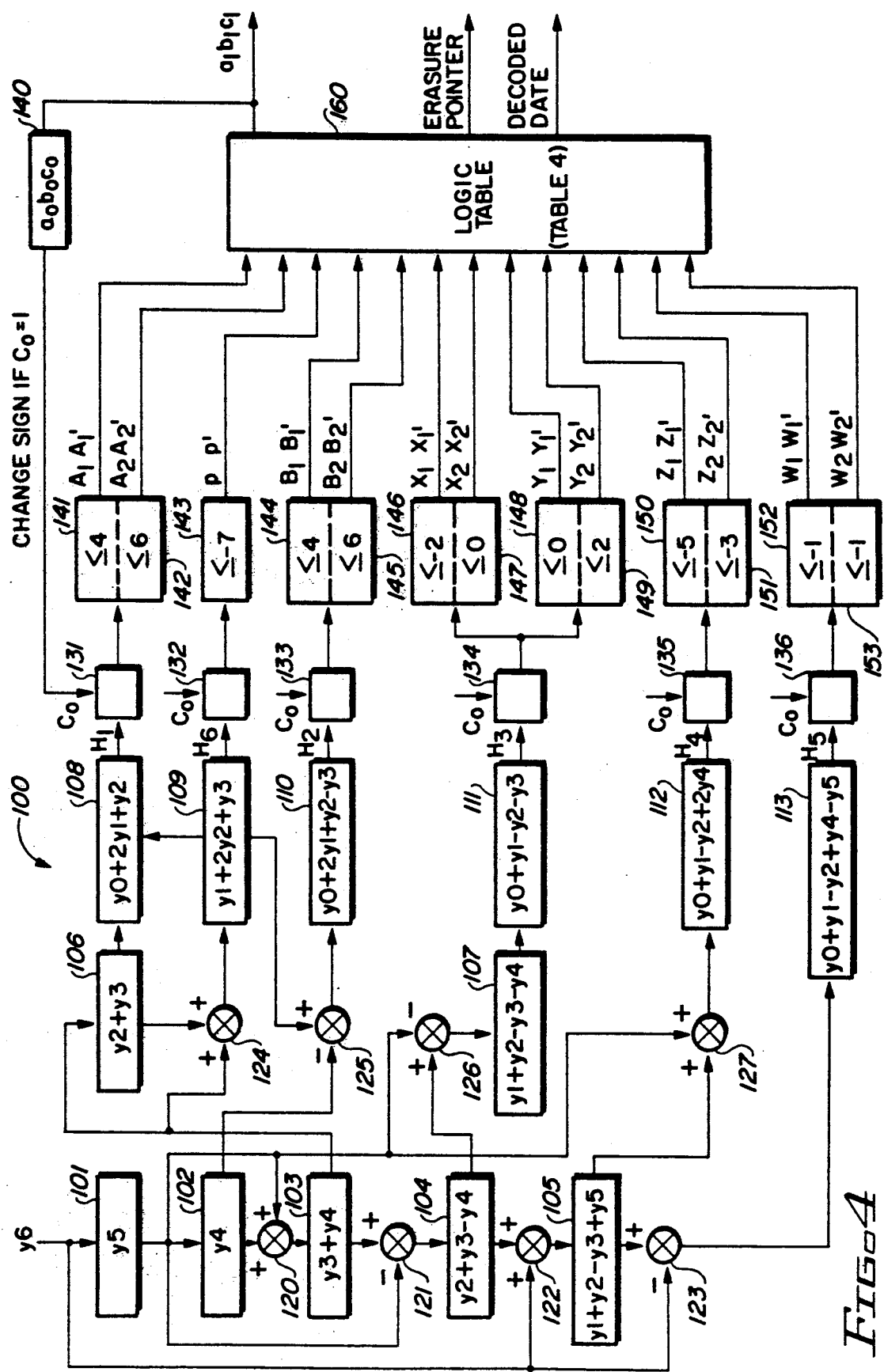
FIG. 4 is a schematic diagram of a decoder embodying a six-sample look-ahead feature and decision boundaries for implementing the invention.

The apparatus thus far described is identical with that in the above-cited application except that decoder 23 in the cited application is replaced by a decoder 100 of FIG. 4 or a decoder 200 of FIG. 6.

Assume that $y_i$ denotes the digitized sample value corresponding to the $i^{th}$ clock cycle. Then, as illustrated in FIG. 4 hereof, the current value of $y_i$ is illustrated as $y_0$, corresponding to the current clock cycle $i=0$. Decoder 100 processes these digitized equalized sample values iteratively, receiving one new sample per clock time with a look-ahead of six sample values. Thus, decoder 100 receives $y_{i+6}$ as it processes the previously received samples and decodes $y_i$ into the $i^{th}$ digit of the recorded sequences.

It should be noted that the decoding process is state dependent. The state of decoder 100 at the $i^{th}$ clock cycle is represented by a three digit binary number $a_i b_i c_i$, where $a_i$, $b_i$ and $c_i$ represent the binary logic levels of the write current (as illustrated in FIG. 3) for the last three bit values at the $i^{th}$ clock cycle. This identifies one of the six possible states, namely, 000, 100, 110, 111, 011, and 001. (The states 101 and 010 do not occur with (1,7) coded data employed in an EPRML channel). During each cycle of clock 13, decoder 100 determines one digit of the recorded (1,7) sequence and also identifies the next decoder state for processing of the next cycle.

The Decoding Algorithm

Decoder 100 executes a novel six-sample look-ahead algorithm using the test definitions and equations in Table 1 for decoding. Table 1 and all other Tables are included in an Appendix hereto and made a part hereof. In this algorithm, the sample value that is currently being decoded is denoted by $y_0$, corresponding to the clock cycle $i=0$. The process is iterative and is driven by read clock 13.

Refer now to Tables 2 and 3 which tabulate the decoding rules for state transitions in positive phase and negative phase, respectively. As noted above, decoder 100 is state dependent; i.e., given the current state $a_0 b_0 c_0$ and sample values $y_0$, $y_1$, $y_2$, $y_3$, $y_4$ and $y_5$, the decoder determines the next state $a_1 b_1 c_1$. It also decodes this state into a data bit $d_0$ as a 1 or 0 (presence or absence of a magnetic transition) in the originally recorded (1,7) data sequence. The actual decision results from the outcome of the tests on the sample values as given by the equations in Table 1.

Tables 2 and 3 show how decoder 100 moves from one state to another in accordance with the combined outcome of the tests at each state. Note that the movement from one state to another is highly structured and that the form of the equations is very simple and similar at various states. The states 110, 100 and 000 (Table 2) corresponding to the positive phase of the signal have mirror image symmetry with states 001, 011, and 111 respectively (Table 3) corresponding to the negative phase of the signal. The mirror image symmetry is characterized by the same structure with a change in the sign for all expressions of the sample values in the corresponding states of the two phases as seen in Tables 1, 2 and 3.

The decisions of decoder 100 are driven by the outcome of three basic checks: namely, (i) the baseline check; (ii) the peak-position check; and (iii) the phase check. The outcomes of these checks are represented in the form of Boolean variables denoted by $A_1$, $A_2$, $B_1$ and $B_2$ for the baseline check; and by $Q_1$ and $Q_2$ for the peak-position check; and by the Boolean variable p for the phase check. 10 According to a feature of the invention, $Q_1$ and $Q_2$ are functions of more specific checks represented by not only $X_1$, $X_2$, $Y_1$, $Y_2$, but also by a modified $Z_1$, $Z_2$ and by a newly added $W_1$ and $W_2$ which uses $y_5$, the sixth look-ahead sample value in its functional expression.

Each check is a comparison of a specific function of the sample values against a fixed threshold. Each threshold is represented by a corresponding constant that is strongly related to the shape of the readback signal and defined by the right-hand side of the corresponding test equation. In the following test equations, the threshold constants correspond to the nominal pulse shape with sample values .., 0, 2, 4, 2, 0, .. and .., 0, −2, −4, −2, 0, .. as illustrated in FIG. 2B.

(i) Baseline Check ($A_1$, $A_2$, $B_1$ and $B_2$)

$$A_1 = 1 \text{ implies } (y_0 + 2y_1 + y_2) \leq 4 \quad (1)$$

$$A_2 = 1 \text{ implies } (y_0 + 2y_1 + y_2) \leq 6 \quad (2)$$

$$B_1 = 1 \text{ implies } y_0 + 2y_1 + y_2 - y_3 \leq 4 \quad (3)$$

$$B_2 = 1 \text{ implies } y_0 + 2y_1 + y_2 - y_3 \leq 6 \quad (4)$$

(ii) Peak-Position Check ($Q_1$ and $Q_2$)

$$Q_1 = X_1 + Y_1 Z_1 W_1 \quad (5)$$

$$Q_2 = X_2 + Y_2 Z_2 W_2 \quad (6)$$

where $$X_1 = 1 \text{ implies } (y_0 + y_1) - (y_2 + y_3) \leq -2 \quad (7)$$

$$X_2 = 1 \text{ implies } (y_0 + y_1) - (y_2 + y_3) \leq 0 \quad (8)$$

$$Y_1 = 1 \text{ implies } (y_0 + y_1) - (y_2 + y_3) \leq 0 \quad (9)$$

$$Y_2 = 1 \text{ implies } (y_0 + y_1) - (y_2 + y_3) \leq 2 \quad (10)$$

$$Z_1 = 1 \text{ implies } (y_0 + y_1) - y_2 + 2y_4 \leq -5 \quad (11)$$

$$Z_2 = 1 \text{ implies } (y_0 + y_1) - y_2 + 2y_4 \leq -3 \quad (12)$$

$$W_1 = 1 \text{ implies } y_0 + y_1 - y_2 + y_4 - y_5 \leq -1 \quad (13)$$

$$W_2 = 1 \text{ implies } y_0 + y_1 - y_2 + y_4 - y_5 \leq 1 \quad (14)$$

(iii) Phase Check (p)

$$p = 1 \text{ implies } (y_1 + 2Y_2 + y_3) \leq -7 \quad (15)$$

Note that the baseline check and phase check are identical with those described in the above cited application although certain algebraic expressions have been converted to an equivalent form. In the improved peak-position check, however, formulae (5) and (6) for $Q_1$ and $Q_2$ and formulae (11) and (12) for $Z_1$ and $Z_2$ have been modified and formulae (13) and (14) for $W_1$ and $W_2$ have been added to provide six-sample look-ahead.

The above tests correspond to the states 100 and 000 in the positive phase of the signal. The same tests with a sign change to all expressions of the sample values are used for the states 011 and 111 in the negative phase of the signal.

The expressions on the left-hand side of equations (1) through (15) are precomputed using six-sample look-ahead with a pipelined network of registers and adders in hardware. As shown in FIG. 4, registers 101-113 hold the respective interim functions of the sample values $y_0$ through $y_5$. During each cycle, the content of each register 101-113 is moved in the direction of the arrow to the next register as appropriate functions are created through eight adder circuits 120-127. Six sign change blocks 131-136 change the sign of the incoming binary number whenever the $c_0$ bit in a state register 140 has the value "1", which corresponds to the states in the negative phase. The outputs from the respective sign change blocks 131-136 are fed to comparators 141-153.

The outputs of comparators 141-153 correspond to those shown in equations (1)-(14) for the variables $A_1$, $A_2$, $B_1$, and $B_2$; equations (7)-(14) for the variables $X_1$, $X_2$, $Y_1$, $Y_2$, $Z_1$, $Z_2$, $W_1$ and $W_2$, respectively; and equation (15) for the variable p. The outputs from the comparators 141-153 are values "1" or "0" which together with the state values $a_0$, $b_0$, $c_0$ from state register 140, are fed to the logic block 160 for implementing the logic shown in Table 4.

The logic of block 160 provides the decoded data $d_0$ corresponding to state $a_0 b_0 c_0$ and the erasure pointer in accordance with the logic of section 1 of Table 4. Block 160 also creates the state value $a_1 b_1 c_1$ for the next state in accordance with the logic of Section 3 including the intermediate logic of section 2 in Table 4. This state value is supplied to state register 50 to become the current state value $a_0 b_0 c_0$ for the next clock cycle.

Programmable or Adaptive Decoding

Table 4 in the related application provided programmed values for thresholds in terms of signal shape given by the general parameters $\alpha_1$, $\beta_1$, $\gamma_1$, $-\alpha_2$, $-\beta_2$, $-\gamma_2$. Table 5 of the present application provides similar programmed values for thresholds including those for the new equations corresponding to Z and W.

Figure 5:
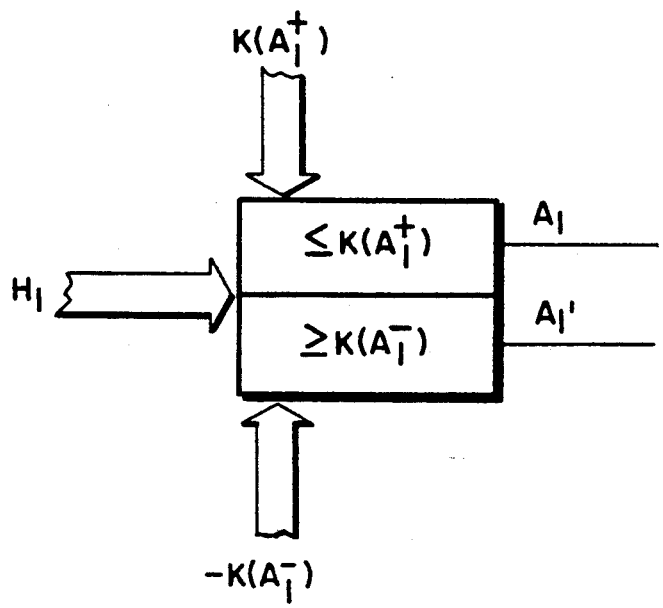
FIG. 5 is a diagram illustrating how the decoder shown in FIG. 4 may be modified to a programmable decoder that adjusts to variations in analog input signal shape.

In Table 5 and in the following description, a plus sign and minus sign are used to denote constants for the positive phase and the negative phase, respectively; whereas primed and nonprimed variable names are used to indicate variables for positive and negative phase, respectively. For example, the test corresponding to Boolean variable $A_1$ will use the constant $KA^+_1$ for the state 100 in the positive phase and the test corresponding to Boolean variable $A'_1$ will use the constant $KA^-_1$ for the state 011 in the negative phase. To implement programmability, the comparator circuit 141 in FIG. 4 corresponding to the Boolean variable $A_1$, is supplied with two separate values for the constant operand, namely $KA^+_1$ and $KA^-_1$, and the output will be two different Boolean variables $A_1$ and $A'_1$ corresponding to state 100 and state 011, respectively, as shown in FIG. 5. The sign change block 131 of FIG. 4 is then not required because ($-H_1 \leq KA^-_1$) can be also implemented as ($H_1 \geq -KA^-_1$). The comparator circuit for each of the thirteen Boolean variables (namely, $A_1$, $A_2$, $B_1$, $B_2$, $X_1$, $X_2$, $Y_1$, $Y_2$, $Z_1$, $Z_2$, $W_1$, $W_2$ and p) will be similarly modified to receive two separate values for the constant operand, and the output will be two separate Boolean variables (the original and the primed) which, in each case, correspond to the states in the positive phase ($c_0 = 0$) and negative phase ($c_0 = 1$), respectively.

When anomalies in the signal shape cannot be compensated for by a filter and an equalizer, such as 12 and 22, the programmable decoder 100 provides an easy means to compensate for misequalization by adjusting the thresholds in the two phases of the decoder. This flexibility permits operating decoder 100 at near-optimum performance even in the absence of ideal shape of the readback signal. In disk files, this is especially important because the programmability of the decoder can be used to change threshold constants at different tracks or bands of tracks and obtain near-optimum performance at all tracks.

The programmability of decoder 100 also enables it to continuously adaptively adjust digital parameters in the decoder. More specifically, the estimated sample values at the output of decoder 100 can be monitored in comparison with the received sample values. When averaged over a preselected number of like sample values, the signal shape can be characterized in terms of the parameters $\alpha_1$, $\beta_1$, $\gamma_1$, $-\alpha_2$, $-\beta_2$, $-\gamma_2$. This information can be used to obtain the corresponding threshold constants (Table 5) and adaptively adjust the decoder for variations in the signal shape.

Also, the decoder threshold values can be easily verified through an extensive amount of testing, and then be adjusted in accordance with the empirical results to accommodate specific anomalies in the signal.

In particular, the first set of preselected thresholds corresponding to the baseline checks A1, A2, B1, B2, and their counterpart checks in the negative phase, is used for controlling the missing bit and extra bit errors caused by media defects-related anomalies in the incoming analog signal; the second set of preselected thresholds corresponding to the peak position checks $X_1$, $X_2$, $Y_1$, $Y_2$, $Z_1$, $Z_2$, $W_1$, $W_2$ and their counterparts in the negative phase, is used for controlling peak-shift errors caused by nonlinearities-related anomalies in said signal; and the third set of preselected thresholds corresponding to the phase check p and p' is used for controlling the propagation of errors in the decoding of said signal and creating pointers to such errors.

High Data Rate Decoding

As earlier noted, the data rate in the (1,7) maximum-likelihood (ML) channel described in the cited application is limited by the speed of the electronic circuitry in a given VLSI technology; in particular, by the time it takes to perform a specific critical operation (within each clock cycle), such as adding two binary numbers and storing the result in a register. If this operation requires t seconds, then the clock cycle time T must be greater than t seconds and thus the data rate 1/T is limited to less than 1/t bits per second. This data rate can be increased n times if n clock cycles are made available to perform this critical operation. This is done by means of a new expanded algorithm that decodes n bits at a time. The expanded algorithm moves computations from register to register once every n cycles. It is implemented by extending the amount of look-ahead of sample values in order to provide sufficient time for precomputations. The invention will be described for the case where n is two.

As illustrated in FIG. 6, the high data rate decoder 200 embodying the invention comprises a serial-to-parallel converter 200a, the output of which is fed to a main part 200b which after the decoding operation outputs to a parallel-to-serial converter 200c. Converters 200a and 200c facilitate two-bit-parallel decoding. In subsequent description, it will be assumed that decoder 200 has been substituted for decoder 23 in the (1,7) ML channel of FIG. 1, and that clock 13 is the primary clock driving converters 200a and 200c, as shown in FIG. 6.

According to an important feature of the invention, main decoder part 200b is driven by an auxiliary clock 201 with a cycle time 2T, where 2T is greater than t and T is cycle time of the primary clock 13 driving the data. As a result, the data rate 1/T has an increased upper limit of 2/t bits per second. The auxiliary clock 201 is derived from primary clock 13. As driven by primary clock 13, ADC 21 of FIG. 1 provides one sample value every T seconds. As shown in FIG. 6, these sample values are distributed to two different data streams by the serial-to-parallel converter 200a, which delivers two successive sample values at a time to each of two precomputation devices 202 and 203.

Figure 7A:
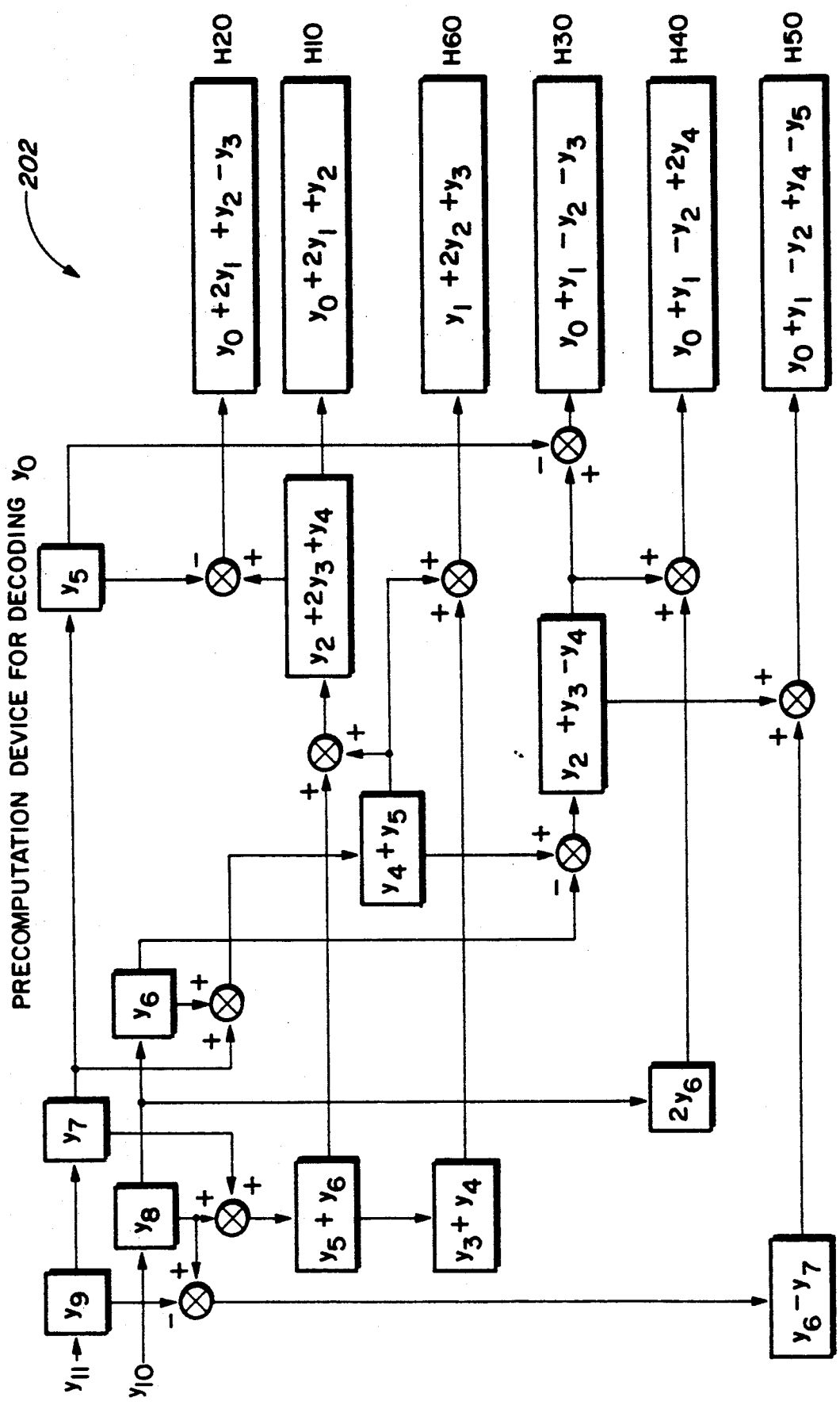
FIGS. 7A and 7B are schematic diagrams showing the specific details of the pipelined data flow through adders and registers for precomputation of two groups of functional expressions of sample values for decoding $y_0$ and $y_1 1$, respectively.
Figure 7B:
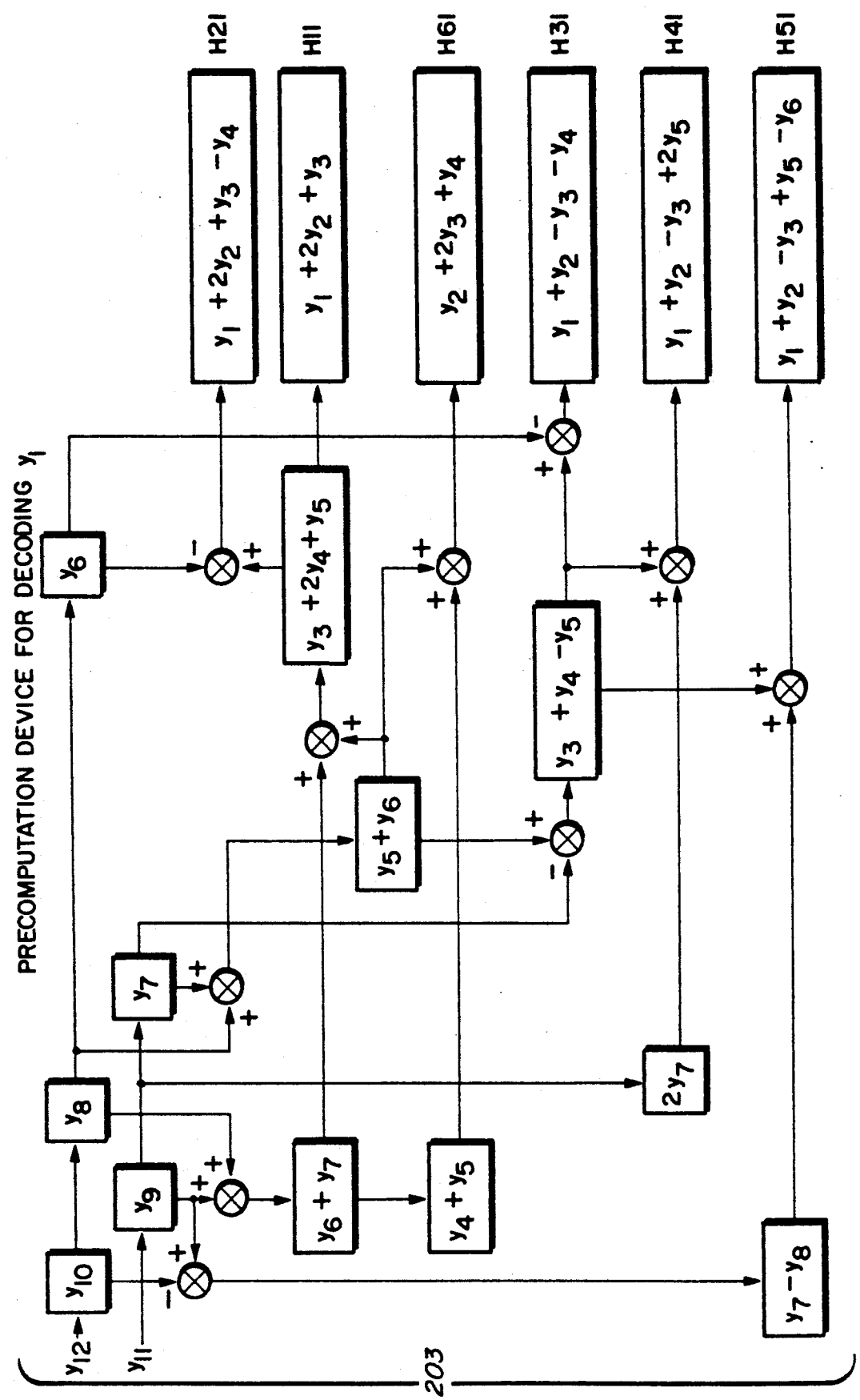

Devices 202 and 203 are shown schematically in FIGS. 7A and 7B, respectively. These devices 202, 203 simultaneously perform precomputation for the two groups of functional expressions of sample values listed in Tables 6A and 6B, respectively. These tables specify the test definitions and decoding equations for two successive data bits $d_0$ and $d_1$, respectively, using the baseline check, peak position check and phase check. Precomputation devices 202, 203 operate during each decoder cycle to move data from one register to the next, thereby desirably allowing 2T amount of time for each add and store operation. FIGS. 7A and 7B show a pipelined configuration in which this 2T time objective is achieved by a look ahead of 10 sample values.

Two comparator logic circuits 204, 205 are provided, one for each data stream. Each circuit 204, 205 individually is essentially unchanged from the one-bit-at-a-time implementation described in connection with FIG. 4, except that there is one such circuit for each data stream. Table 6A differs from Table 1 only in the subscripts used to distinguish the association with data bit $d_0$; the expressions are otherwise identical. For example, $H_1$ becomes $H_{10}$, $H_2$ becomes $H_{20}$, ....., $H_6$ becomes $H_{60}$; and each of these new subscripted expressions represents association with sample value $y_0$ and the corresponding data bit $d_0$.

The precomputation equations in Table 6B corresponding to data bit $d_1$ are new expressions $H_{11}$, $H_{21}$, ..., $H_{61}$ derived from the corresponding expressions $H_{10}$, $H_{20}$, ..., $H_{60}$ in Table 6A by shifting the subscript values by one count for each corresponding sample value. These equations in Table 6B are used to decode the sample value $y_1$ into the corresponding next data bit $d_1$. The thresholds in Tables 6A and 6B are the same as in Table 5, and are programmable for both groups of functional expressions. The compare positive and compare negative functions in comparators 204 and 205, respectively, are carried out in a manner similar to those in FIG. 5.

Tables 7A and 7B show the intermediate logic 206 and 207, respectively, and the computation of the states $a_1b_1c_1$ and $a_2b_2c_2$, and the detected data $d_0$, $d_1$ and the pointers $P_0$, $P_1$. When the outputs ($A_{10}$, $B_{10}$, etc.) of comparators 204, 205 are available, the intermediate logic as given in Section 2 of Tables 7A and 7B is used to compute $R_{10}$, $R_{20}$, $R'_{10}$, $R'_{20}$ and also $R_{11}$, $R_{21}$, $R'_{11}$, $R'_{21}$. These are computed simultaneously without waiting for the sample y0 to be decoded. Once again, the amount of time available to complete the calculation in devices 204 and 205 is 2T. The combined time required for execution by the comparator logic and the intermediate logic is still less than t seconds, the time required in the add and store operation. The final step is the calculation of the decoded data, the pointer and the next state.

Logic block 208 implements the functions shown in Sections 1 and 3 of Tables 7A and 7B. The longest path here is the calculation of $c_2$ for the state $a_2b_2c_2$, which requires $c_1$ of state $a_1b_1c_1$. The time required for this logic is still less than t seconds, the time required by the add and store operation. Logic block 208 provides the output $a_2b_2c_2$ which then becomes the current state $a_0b_0c_0$ for the next iteration of the decoder cycle as it is stored in an appropriate register 209. The other outputs of logic block 208 are the two decoded data bits $d_0$ and $d_1$ and the corresponding pointer values $P_0$ and $P_1$. These outputs are serialized by means of the parallel-toserial converter 200c for the final output of one bit at a time clocked by primary clock 13.

Programmability of decoder 200 is achieved in the same manner as described in the "Programmable or Adaptive Decoding" section for the previous decoder 100.

While the invention has been shown and described with respect to a preferred embodiment thereof, it will be understood by those skilled in the art that changes in form and detail may be made in this embodiment without departing from the scope and teaching of the invention. Accordingly, the method herein disclosed is to be considered merely as illustrative, and the invention is to be limited only as specified in the claims.

TABLE 4
Intermediate Logic and Output Logic

1. Decoded Data and Pointer
$d_0 = b_0c_0 + b_0c_0$
$P = pb_0c_0 + p'b_0c_0$

2. Intermediate Logic
$R_1 = A_1B_1 + X_1 + Y_1Z_1W_1$   $R'_1 = A'_1B'_1 + X'_1 + Y'_1Z'_1W'_1$
$R_2 = A_2B_2 + X_2 + Y_2Z_2W_2$   $R'_2 = A'_2B'_2 + X'_2 + Y'_2Z'_2W'_2$ 3. Next State
$a_1 = pb_0c_0 + b_0c_0 + p'b_0c_0$
$b_1 = pb_0c_0 + p'c_0 + b_0c_0$
$c_1 = pb_0 + b_0c_0 + R_1b_0a_0 + R_2a_0c_0 + p'R'_1a_0b_0 + p'R'_2a_0c_0$

TABLE 1
Test Definitions and Equations for Decoding

| Precomputed Functions of Sample Values | Positive Phase | | Negative Phase | |
|---|---|---|---|---|
| | State 1 0 0 | State 0 0 0 | State 0 1 1 | State 1 1 1 |
| Baseline Check | | | | |
| $H_1 = (y_0 + 2y_1 + y_2)$ | $A_1 = (H_1 \leq 4)$ | $A_2 = (H_1 \leq 6)$ | $A'_1 = (-H_1 \leq 4)$ | $A'_2 = (-H_1 \leq 6)$ |
| $H_2 = (y_0 + 2y_1 + y_2 - y_3)$ | $B_1 = (H_2 \leq 4)$ | $B_2 = (H_2 \leq 6)$ | $B'_1 = (-H_2 \leq 4)$ | $B'_2 = (-H_2 \leq 6)$ |
| Peak Position Check | | | | |
| $H_3 = (y_0 + y_1) - (y_2 + y_3)$ | $X_1 = (H_3 \leq -2)$ | $X_2 = (H_3 \leq 0)$ | $X'_1 = (-H_3 \leq -2)$ | $X'_2 = (-H_3 \leq 0)$ |
| | $Y_1 = (H_3 \leq 0)$ | $Y_2 = (H_3 \leq 2)$ | $Y'_1 = (-H_3 \leq 0)$ | $Y'_2 = (-H_3 \leq 2)$ |
| $H_4 = (y_0 + y_1 - y_2 + 2y_4)$ | $Z_1 = (H_4 \leq -5)$ | $Z_2 = (H_4 \leq -3)$ | $Z'_1 = (-H_4 \leq -5)$ | $Z'_2 = (-H_4 \leq -3)$ |
| $H_5 = (y_0 + y_1 - y_2 + y_4 - y_5)$ | $W_1 = (H_5 \leq -1)$ | $W_2 = (H_5 \leq 1)$ | $W'_1 = (-H_5 \leq -1)$ | $W'_2 = (-H_5 \leq 1)$ |
| Phase Check | | | | |
| $H_6 = (y_1 + 2y_2 + y_3)$ | $p = (H_6 \leq -7)$ | | $p' = (-H_6 \leq -7)$ | |

TABLE 2
Decoding Rules for State Transitions in Positive Phase

| Current State | | | | Results of Tests on Sample Values | | Next State | | | |
|---|---|---|---|---|---|---|---|---|---|
| $a_0$ | $b_0$ | $c_0$ | $\tilde{y}_{-1}$ | $y_0, y_1, y_2, y_3, y_4, y_5$ | Decoded Data | $a_1$ | $b_1$ | $c_1$ | $\tilde{y}_0$ |
| 1 | 1 | 0 | −2 or 0 | None | 1 | 1 | 0 | 0 | −4 |
| 1 | 0 | 0 | −4 | $(A_1B_1 + X_1 + Y_1Z_1W_1) = 1$ | 0 | 0 | 0 | 0 | −2 |
| | | | | Otherwise | 0 | 0 | 0 | 1 | 0 |
| 0 | 0 | 0 | 0 or −2 | $(A_2B_2 + X_2 + Y_2Z_2W_2) = 1$ | 0 | 0 | 0 | 0 | 0 |
| | | | | Otherwise | 0 | 0 | 0 | 1 | 2 |
| 1 | 0 | 0 | — | Phase Check $p = 1$ | Erasure | 1 | 1 | 1 | ? |
| 0 | 0 | 0 | | | | | | | |

Note: Phase check overrides all other tests.

TABLE 3
Decoding Rules for State Transitions in Negative Phase

| Current State | | | | Results of Tests on Sample Values | | Next State | | | |
|---|---|---|---|---|---|---|---|---|---|
| $a_0$ | $b_0$ | $c_0$ | $\tilde{y}_{-1}$ | $y_0, y_1, y_2, y_3, y_4, y_5$ | Decoded Data | $a_1$ | $b_1$ | $c_1$ | $\tilde{y}_0$ |
| 0 | 0 | 1 | 2 or 0 | None | 1 | 0 | 1 | 1 | 4 |
| 0 | 1 | 1 | 4 | $(A_1'B_1' + X_1' + Y_1'Z_1'W_1') = 1$ | 0 | 1 | 1 | 1 | 2 |
| | | | | Otherwise | 0 | 1 | 1 | 0 | 0 |
| 1 | 1 | 1 | 0 or 2 | $(A'_2B'_2 + X'_2 + Y'_2Z'_2W'_2) = 1$ | 0 | 1 | 1 | 1 | 0 |
| | | | | Otherwise | 0 | 1 | 1 | 0 | −2 |
| 0 | 1 | 1 | — | Phase Check $p' = 1$ | Erasure | 0 | 0 | 0 | ? |
| 1 | 1 | 1 | | | | | | | |

Note: Phase check overrides all other tests.

TABLE 5
Programmed Values for Test Thresholds [Nominal Values]

| | | Positive Phase | | Negative Phase | |
|---|---|---|---|---|---|
| Test | State 1 0 0 | State 0 0 0 | | State 0 1 1 | State 1 1 1 |
| Baseline Check | | | | | |
| A | $KA_1^+ = KA_2^+ - \gamma_2 [4]$ | $KA_2^+ = (\alpha_1 + 2\beta_1 + \gamma_1)/2 [6]$ | | $KA_1^- = KA_2^- - \gamma_1 [4]$ | $KA_2^- = (\alpha_2 + 2\beta_2 + y_2)/2 [6]$ |
| B | $KB_1^+ = KA_2^+ - \gamma_2 [4]$ | $KB_2^+ = KA_2^+ [6]$ | | $KB_1^- = KA_1^- - \gamma_1 [4]$ | $KB_2^- = KA_2^- [6]$ |
| Peak Position Check | | | | | |
| X | $KX_1^+ = KX_2^+ - \gamma_2 [-2]$ | $KX_2^+ = \alpha_1 - \gamma_1 [0]$ | | $KX_1^- = KX_2^- - \gamma_1 [-2]$ | $KX_2^- = \alpha_2 - \gamma_2 [0]$ |
| Y | $KY_1^+ = KY_2^+ - \gamma_2 [0]$ | $KY_2^+ = \alpha_2 + \alpha_1 - \gamma_1 [2]$ | | $KY_1^- = KY_2^- - \gamma_1 [0]$ | $KY_2^- = \alpha_1 + \alpha_2 - \gamma_2 [2]$ |
| Z | $KZ_1^+ = KZ_2^+ - \gamma_2 [-5]$ | $KZ_2^+ = \alpha_1 - \beta_2 - \gamma_1/2 [-3]$ | | $KZ_1^- = KZ_2^- - \gamma_1 [-5]$ | $KZ_2^- = \alpha_2 - \beta_1 - \gamma_2/2 [-3]$ |
| W | $KW_1^+ = KW_2^+ - \gamma_2 [-1]$ | $KW_2^+ = \alpha_1 + (\gamma_2 - \gamma_1 - \alpha_2)/2 [1]$ | | $KW_1^- = KW_2^- - \gamma_1 [-1]$ | $KW_2^- = \alpha_2 + (\gamma_1 - \gamma_2 -$ |

TABLE 5-continued

| | Programmed Values for Test Thresholds [Nominal Values] | | | |
|---|---|---|---|---|
| | Positive Phase | | Negative Phase | |
| Test | State 1 0 0 | State 0 0 0 | State 0 1 1 | State 1 1 1 |
| Phase Check | | | $\alpha_1)/2$ [1] | |
| P | $Kp^+ = -(KA_2^-) \times 7/6$ [-7] | | $Kp^- = -(KA_2^+) \times 7/6$ [-7] | |

Note: The positive and negative readback pulses are $(\ldots, 0, \alpha_1, \beta_1, \gamma_1, 0 \ldots)$ and $(\ldots, 0, -\alpha_2, -\beta_2, -\gamma_2, 0, \ldots)$ respectively. The nominal values are $\alpha_1 = \alpha_2 = 2$, $\beta_1 = \beta_2 = 4$, $\gamma_1 = \gamma_2 = 2$.

TABLE 6

| Precomputed Functions of Sample Values | Positive Phase | | Negative Phase | |
|---|---|---|---|---|
| | State 1 0 0 | State 0 0 0 | State 0 1 1 | State 1 1 1 |

Test Definitions and Equations for Decoding $y_0$

Baseline Check

$H_{10} = (y_0 + 2y_1 + y_2)$    $A_{10} = (H_{10} \leq KA_1^+)$    $A_{20} = (H_{10} \leq KA_2^+)$    $A'_{10} = (-H_{10} \leq KA_1^-)$    $A'_{20} = (-H_{10} \leq KA_2^-)$ $H_{20} = (y_0 + 2y_1 + y_2 - y_3)$    $B_{10} = (H_{20} \leq KB_1^+)$    $B_{20} = (H_{20} \leq KB_2^+)$    $B'_{10} = (-H_{20} \leq KB_1^-)$    $B'_{20} = (-H_{20} \leq KB_2^-)$

Peak Position Check

$H_{30} = (y_0 + y_1) - (y_2 + y_3)$    $X_{10} = (H_{30} \leq KX_1^+)$    $X_{20} = (H_{30} \leq KX_2^+)$    $X'_{10} = (-H_{30} \leq KX_1^-)$    $X'_{20} = (-H_{30} \leq KX_2^-)$ $Y_{10} = (H_{30} \leq KY_1^+)$    $Y_{20} = (H_{30} \leq KY_2^+)$    $Y'_{10} = (-H_{30} \leq KY_1^-)$    $Y'_{20} = (-H_{30} \leq KY_2^-)$ $H_{40} = (y_0 + y_1 - y_2 + 2y_4)$    $Z_{10} = (H_{40} \leq KZ_1^+)$    $Z_{20} = (H_{40} \leq KZ_2^+)$    $Z'_{10} = (-H_{40} \leq KZ_1^-)$    $Z'_{20} = (-H_{40} \leq KZ_2^-)$ $H_{50} = (y_0 + y_1 - y_2 + y_4 - y_5)$    $W_{10} = (H_{50} \leq KW_1^+)$    $W_{20} = (H_{50} \leq KW_2^+)$    $W'_{10} = (-H_{50} \leq KW_1^-)$    $W'_{20} = (-H_{50} \leq KW_2^-)$

Phase Check

$H_{60} = (y_1 + 2y_2 + y_3)$      $p_0 = (H_{60} \leq Kp^+)$      $p'_0 = (-H_{60} \leq Kp^-)$

Test Definitions and Equations for Decoding $y_1$

Baseline Check

$H_{11} = (y_1 + 2y_2 + y_3)$    $A_{11} = (H_{11} \leq KA_1^+)$    $A_{21} = (H_{11} \leq KA_2^+)$    $A'_{11} = (-H_{11} \leq KA_1^-)$    $A'_{21} = (-H_{11} \leq KA_2^-)$ $H_{21} = (y_1 + 2y_2 + y_3 - y_4)$    $B_{11} = (H_{21} \leq KB_1^+)$    $B_{21} = (H_{21} \leq KB_2^+)$    $B'_{11} = (-H_{21} \leq KB_1^-)$    $B'_{21} = (-H_{21} \leq KB_2^-)$

Peak Position Check

$H_{31} = (y_1 + y_2) - (y_3 + y_4)$    $X_{11} = (H_{31} \leq KX_1^+)$    $X_{21} = (H_{31} \leq KX_2^+)$    $X'_{11} = (-H_{31} \leq KX_1^-)$    $X'_{21} = (-H_{31} \leq KX_2^-)$ $Y_{11} = (H_{31} \leq KY_1^+)$    $Y_{21} = (H_{31} \leq KY_2^+)$    $Y'_{11} = (-H_{31} \leq KY_1^-)$    $Y'_{21} = (-H_{31} \leq KY_2^-)$ $H_{41} = (y_1 + y_2 - y_3 + 2y_5)$    $Z_{11} = (H_{41} \leq KZ_1^+)$    $Z_{21} = (H_{41} \leq KZ_2^+)$    $Z'_{11} = (-H_{41} \leq KZ_1^-)$    $Z'_{21} = (-H_{41} \leq KZ_2^-)$ $H_{51} = (y_1 + y_2 - y_3 + y_5 - y_6)$    $W_{11} = (H_{51} \leq KW_1^+)$    $W_{21} = (H_{51} \leq KW_2^+)$    $W'_{11} = (-H_{51} \leq KW_1^-)$    $W'_{21} = (-H_{51} \leq KW_2^-)$

Phase Check

$H_{61} = (y_2 + 2y_3 + y_4)$      $p_1 = (H_{61} \leq Kp^+)$      $p'_1 = (-H_{61} \leq Kp^-)$

TABLE 7

Intermediate Logic and Output Logic for Decoding $y_0$

1. Decoded Data and Pointer

$d_0 = b_0c_0 + b_0c_0$
$P_0 = p_0b_0c_0 + p'_0b_0c_0$

2. Intermediate Logic

$R_{10} = A_{10}B_{10} + X_{10} + Y_{10}Z_{10}W_{10}$    $R'_{10} = A'_{10}B'_{10} + X'_{10} + Y'_{10}Z'_{10}W''_{10}$ $R_{20} = A_{20}B_{20} + X_{20} + Y_{20}Z_{20}W_{20}$    $R'_{20} = A'_{20}B'_{20} + X'_{20} + Y'_{20}Z'_{20}W''_{20}$

3. Next State

$a_1 = p_0b_0c_0 + b_0c_0 + p'_0b_0c_0$
$b_1 = p_0b_0c_0 + p'_0c_0 + b_0c_0$
$c_1 = p_0b_0 + b_0c_0 + R_{10}b_0a_0 + R_{20}a_0c_0 + p'_0R'_{10}a_0b_0 + p'_0R'_{20}a_0c_0$

Intermediate Logic and Output Logic for Decoding $y_1$

1. Decoded Data and Pointer

$d_1 = b_1c_1 + b_1c_1$
$P_1 = p_1b_1c_1 + p'_1b_1c_1$

2. Intermediate Logic

$R_{11} = A_{11}B_{11} + X_{11} + Y_{11}Z_{11}W_{11}$    $R'_{11} = A'_{11}B'_{11} + X'_{11} + Y'_{11}Z'_{11}W''_{11}$ $R_{21} = A_{21}B_{21} + X_{21} + Y_{21}Z_{21}W_{21}$    $R'_{21} = A'_{21}B'_{21} + X'_{21} + Y'_{21}Z'_{21}W''_{21}$

3. Next State

$a_2 = p_1b_1c_1 + b_1c_1 + p'_1b_1c_1$
$b_2 = p_1b_1c_1 + p'_1c_1 + b_1c_1$
$c_2 = p_1b_1 + b_1c_1 + R_{11}b_1a_1 + R_{21}a_1c_1 + p'_1R'_{11}a_1b_1 + p'_1R'_{21}a_1c_1$

We claim:

1. A method of analyzing electrical signals which increases the rate at which data may be processed in a signal processing channel, comprising the steps of:

generating an analog electrical signal from binary coded data read by a transducer from a data storage medium;

with an auxiliary clock iterating successive sets of clock cycles every n cycles of a primary clock;

converting the analog signal into digital electrical output signals constituting digital sample values at successive clock cycles using a state-dependent sequence detection algorithm including n groups of appropriate functional expressions of digital sample values, which expressions in each group are identical in structure but offset one bit count from the next; and during each iterating step, with electronic circuitry, including a decoder, precomputing the value of each expression in the said n groups of expressions from a preselected number of sample values ahead of a then current sample value $Y_0$ using a different number of sample values greater than said preselected number further ahead of the current sample value in order to allow sufficient time for clocking predetermined logic operations.

2. The method of claim 1, including, during each iterating step, the step of:

using a comparator, comparing preselected ones of the said expression values against corresponding thresholds to provide respective binary decision outputs corresponding to each of said n groups.

3. The method of claim 2, wherein the comparing step includes:
comparing the value of each of said expressions against an appropriate threshold which is the same for the corresponding expressions in each of said groups.

4. The method of claim 2, including during the determining step:
using said binary decision outputs from the comparator for the first of the n groups in conjunction with a then the current state value, determining the first of n next successive state values;
using said binary decision outputs for the second of the n groups in conjunction with the first state value, determining the second of said n successive state values; and
repeating the preceding step for each of the remaining (n−2) groups until the last of the n successive state values, which becomes the current state value for the next iteration.

5. The method of claim 1, including the step of:
combining some of the results of the comparing step and the said current and next (n−1) state values into n erasure pointers that indicate presence of any error in a previous decoding decision.

6. The method of claim 1, wherein said different number is at least 10.

7. The method of claim 4, including the step of:
logically combining the said current and next (n−1) state values to determine corresponding sets of n bits representative of the coded binary data at each successive iteration.

8. The method of claim 1, including during the precomputing step:
precomputing a peak position check which includes expressions that use up to six sample values ahead of the then current sample value $y_0$.

9. The method of claim 8, wherein said functional expressions include, as one of the groups, for calculating a peak position check:

$(y_0+y_1)-(y_2+y_3)$, and $(y_0+y_1-y_2+2y_4)$, and $(y_0+y_1-y_2+y_4-y_5)$, where y denotes sample value of an analog read signal, and the subscripts denote the look ahead count of that sample value from the then current sample value $y_0$.

10. The method of claim 9, wherein said functional expressions also include as another group, for calculating the peak position check:

$(y_1+y_2)-(y_3+y_4)$, and $(y_1+y_2-y_3+2y_5)$, and $(y_1+y_2-y_3+y_5-y_6)$, where y denotes sample value of an analog read signal, and the subscripts denote the look ahead count of that sample value from the then current sample value $y_0$.

11. The method of claim 8, wherein said expressions are provided with thresholds specifically constructed to overcome distortions due to nonlinearities in the signal peculiar to magnetic and optical recording.

12. The method of claim 1, wherein the precomputing step is performed using the electronic circuitry in a pipelined configuration.

13. The method of claim 1, wherein the sets are pairs and n=2.

14. Apparatus for increasing the rate at which analog electrical signals read by a transducer from a data storage medium can be processed in a signal processing channel, comprising:
a primary clock;
an auxiliary clock iterating successive sets of clock cycles every n cycles of the primary clock,
an analog-to-digital converter (ADC) triggered by the primary clock for converting the analog electrical signals into digital electrical output signals constituting digital sample values at successive cycles of the primary clock using a state-dependent sequence detection algorithm that includes n groups of appropriate groups are identical in structure but offset one bit count from the next; and
means, including a decoder, for precomputing the value of each expression in the said n groups of expressions from a preselected number of sample values ahead of a then current sample value using a different number of sample values greater than said preselected number further ahead of said then current sample value to allow sufficient time for clocking predetermined logic operations to increase the rate at which the analog electrical signals can be processed.

* * * * *

UNITED STATES PATENT AND TRADEMARK OFFICE
CERTIFICATE OF CORRECTION

PATENT NO. : 5,282,216
DATED : January 25, 1994
INVENTOR(S) : A. M. Patel

It is certified that error appears in the above-identified patent and that said Letters Patent is hereby corrected as shown below:

In the title, first line, after "METHOD", insert --AND MEANS--.

In the title, second line, delete "CODING", insert --CODED--.

Column 4, line 61, after "check", delete "10".
Column 4, line 61, after "phase check." start new paragraph with "According".

Column 5, line 43, delete "wi$^{th}$", insert --with--.

Column 6, line 35, after "phase." start new paragraph with "To implement".

Column 7, line 12, delete "A1, A2, B1, B2,", insert --$A_1$, $A_2$, $B_1$, $B_2$,--.

Tables 4, 7A and 7B should appear as per attached.

Column 13, line 18, delete "wi$^{th}$", insert --with--.

Column 14, line 38, after "appropriate", insert --functional expressions of digital sample values, each of which n--.

Signed and Sealed this

Second Day of August, 1994

Attest:

BRUCE LEHMAN

Attesting Officer    Commissioner of Patents and Trademarks

| Table 4. Intermediate Logic and Output Logic |
|---|
| 1. Decoded Data and Pointer<br><br>$d_0 = b_0\bar{c}_0 + \bar{b}_0 c_0$<br><br>$P = p\bar{b}_0\bar{c}_0 + p'b_0 c_0$ |
| 2. Intermediate Logic<br><br>$R_1 = A_1 B_1 + X_1 + Y_1 Z_1 W_1 \qquad R'_1 = A'_1 B'_1 + X'_1 + Y'_1 Z'_1 W'_1$<br><br>$R_2 = A_2 B_2 + X_2 + Y_2 Z_2 W_2 \qquad R'_2 = A'_2 B'_2 + X'_2 + Y'_2 Z'_2 W'_2$ |
| 3. Next State<br><br>$a_1 = p\bar{b}_0\bar{c}_0 + b_0\bar{c}_0 + \bar{p}'b_0 c_0$<br><br>$b_1 = p\bar{b}_0\bar{c}_0 + \bar{p}'c_0 + \bar{b}_0 c_0$<br><br>$c_1 = p\bar{b}_0 + \bar{b}_0 c_0 + \bar{R}_1 \bar{b}_0 a_0 + \bar{R}_2 \bar{a}_0 \bar{c}_0 + \bar{p}' R'_1 \bar{a}_0 b_0 + \bar{p}' R'_2 a_0 c_0$ |

Table 7A. Intermediate Logic and Output Logic for Decoding $y_0$

1. Decoded Data and Pointer

$d_0 = b_0\bar{c}_0 + \bar{b}_0 c_0$ $P_0 = p_0\bar{b}_0\bar{c}_0 + p'_0 b_0 c_0$

2. Intermediate Logic

$R_{10} = A_{10}B_{10} + X_{10} + Y_{10}Z_{10}W_{10}$        $R'_{10} = A'_{10}B'_{10} + X'_{10} + Y'_{10}Z'_{10}W'_{10}$ $R_{20} = A_{20}B_{20} + X_{20} + Y_{20}Z_{20}W_{20}$        $R'_{20} = A'_{20}B'_{20} + X'_{20} + Y'_{20}Z'_{20}W'_{20}$

3. Next State

$a_1 = p_0\bar{b}_0\bar{c}_0 + b_0\bar{c}_0 + \bar{p}'_0 b_0 c_0$ $b_1 = p_0\bar{b}_0\bar{c}_0 + \bar{p}'_0 c_0 + \bar{b}_0 c_0$ $c_1 = p_0\bar{b}_0 + \bar{b}_0 c_0 + \bar{R}_{10}\bar{b}_0 a_0 + \bar{R}_{20}\bar{a}_0\bar{c}_0 + \bar{p}'_0 R'_{10}\bar{a}_0 b_0 + \bar{p}'_0 R'_{20} a_0 c_0$

Table 7B. Intermediate Logic and Output Logic for Decoding $y_1$

1. Decoded Data and Pointer

$d_1 = b_1\bar{c}_1 + \bar{b}_1 c_1$ $P_1 = p_1\bar{b}_1\bar{c}_1 + p'_1 b_1 c_1$

2. Intermediate Logic

$R_{11} = A_{11}B_{11} + X_{11} + Y_{11}Z_{11}W_{11}$        $R'_{11} = A'_{11}B'_{11} + X'_{11} + Y'_{11}Z'_{11}W'_{11}$ $R_{21} = A_{21}B_{21} + X_{21} + Y_{21}Z_{21}W_{21}$        $R'_{21} = A'_{21}B'_{21} + X'_{21} + Y'_{21}Z'_{21}W'_{21}$

3. Next State

$a_2 = p_1\bar{b}_1\bar{c}_1 + b_1\bar{c}_1 + \bar{p}'_1 b_1 c_1$ $b_2 = p_1\bar{b}_1\bar{c}_1 + \bar{p}'_1 c_1 + \bar{b}_1 c_1$ $c_2 = p_1\bar{b}_1 + \bar{b}_1 c_1 + \bar{R}_{11}\bar{b}_1 a_1 + \bar{R}_{21}\bar{a}_1\bar{c}_1 + \bar{p}'_1 R'_{11}\bar{a}_1 b_1 + \bar{p}'_1 R'_{21} a_1 c_1$